United States Patent
Guerret et al.

(10) Patent No.: US 8,191,807 B2
(45) Date of Patent: Jun. 5, 2012

(54) USE OF ACRYLIC COMB POLYMERS WITH HYDROPHOBIC GROUPS AS COUPLING AGENTS IN A METHOD FOR GRINDING MINERAL MATERIALS WITH BINDERS

(75) Inventors: Olivier Guerret, La Tour de Salvagny (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 272 days.

(21) Appl. No.: 12/689,631

(22) Filed: Jan. 19, 2010

(65) Prior Publication Data

US 2010/0181395 A1 Jul. 22, 2010

Related U.S. Application Data

(60) Provisional application No. 61/150,332, filed on Feb. 6, 2009.

(30) Foreign Application Priority Data

Jan. 16, 2009 (FR) ...................................... 09 50247

(51) Int. Cl.
*B02C 19/00* (2006.01)
(52) U.S. Cl. ......................................................... 241/16
(58) Field of Classification Search .................... 241/15, 241/16; 106/436, 400, 401, 463, 464, 471, 106/484
See application file for complete search history.

(56) References Cited

U.S. PATENT DOCUMENTS

| 7,772,351 B2 * | 8/2010 | Dupont et al. ................... 528/25 |
| 2007/0249758 A1 * | 10/2007 | Suau et al. ...................... 523/334 |
| 2007/0266898 A1 * | 11/2007 | Gane et al. ...................... 106/436 |
| 2008/0210394 A1 * | 9/2008 | Mahr et al. ...................... 162/162 |

FOREIGN PATENT DOCUMENTS

| WO | WO 2008125873 | * 10/2008 |
| WO | 2008/139292 A1 | 11/2008 |

OTHER PUBLICATIONS

International Search Report and Written Opinion mailed May 28, 2010 issued in PCT/IB2010/000034.

* cited by examiner

*Primary Examiner* — Mark Rosenbaum
(74) *Attorney, Agent, or Firm* — Oblon, Spivak, McClelland, Maier & Neustadt, L.L.P.

(57) ABSTRACT

The invention pertains to the use as a coupling agent, in a method for manufacturing self-binding particles by grinding at least one latex binder and at least one mineral material in an aqueous medium, of an aqueous solution of a fully or partially acidic water-soluble copolymer, present during the step of grinding, wherein the copolymer is made up of at least one ethylenically-unsaturated anionic monomer, and at least one ethylenically-unsaturated oxyalkylated monomer terminated by a hydrophobic alkyl, alkylaryl, arylakyl, or aryl chain having 10 to 32 carbon atoms.

26 Claims, No Drawings

USE OF ACRYLIC COMB POLYMERS WITH HYDROPHOBIC GROUPS AS COUPLING AGENTS IN A METHOD FOR GRINDING MINERAL MATERIALS WITH BINDERS

REFERENCE TO RELATED APPLICATIONS

The present application is related to and claims priority from U.S. Provisional Application Ser. No. 61/150,332, filed Feb. 6, 2009, and French patent application No. 09 50247, filed in France on Jan. 16, 2009, the entire contents of each of which are hereby incorporated by reference.

BACKGROUND OF THE INVENTION

Binders and mineral materials are among the main components of paper. Binders, which come in the form of aqueous dispersions or suspensions of latex, impart the necessary cohesion to all of the components involved in manufacturing said paper. Mineral materials, such as calcium carbonate, make it possible to improve the quality of the sheet of paper, particularly with regard to its optical properties.

The concept of "hybrid" or "self-binding" particles appeared several years ago. These are individual solid particles in which particles of mineral materials and latex particles are intimately bound. The internal cohesion forces are such that the resulting particles have an excellent mechanical stability, and may be implemented directly in the manufacture of paper.

If this is done, the logistical problems related to handling two products, binders and mineral materials, are avoided, and unwanted physical and chemical interactions related to mixing these two products are also reduced when they are implemented separately. To that end, one may refer to the document "Physical and Chemical Modifications in latex binders and their effects on the coating colour rheology" (Advanced Coating Fundamentals Symposium, San Diego, Calif., USA, May 4-5, 2001, pp 108-123), which demonstrates the harmful influence that mixing a sytrene-butadiene latex binder with calcium carbonate has on the rheology of a paper coating slip.

The methods for manufacturing such particles involve at least one step of grinding mineral materials in the presence of binders. Grinding refers to an operation that leads to a reduction in the size of the particles: the size of the hybrid particles that are formed is smaller than the size of the initial mineral material particles. Several descriptions and variants in this matter can now be found in documents WO 2006 008657, WO 2006 128814 and WO 2008 139292.

Document WO 2006 008657 describes a method for co-grinding inorganic materials in an aqueous medium, in the presence of binders. The self-binding nature is measured using a crush test performed on samples taken from the solid particles that result from the step of co-grinding. Out of the 6 examples illustrating the invention, 4 of them (examples 1, 3, 5, and 6) implement 2 binders, including an acrylic ethylene-acid copolymer (Polygen™ WE 4 sold by BASF™). Furthermore, only tests 5 and 6 lead to end concentrations of calcium carbonate greater than 50% of their total weight; in such a case, a wetting agent and an acrylic dispersing agent must then be added to the suspension resulting from the grinding.

Document WO 2006 128814 focuses on the impact of such hybrid particles on the final properties of the sheet of paper: it particularly states that the optical properties of the sheet, such as its opacity, are improved. It describes the manufacturing of these particles by means of a method of grinding calcium carbonate in water in the presence of binders, particularly with Polygen™ WE 4 (in 3 of the 4 tests). On the other hand, none of the resulting aqueous suspensions have a solids content of mineral materials greater than 30% of their weight.

Document WO 2008 139292, meanwhile, discloses a method implementing a step of grinding a binder in the presence of a mineral material, followed by adding an inverse emulsion; the tests illustrate the implementation of Polygen™ WE 4, in order to grind a mixture of calcium carbonate with binder at a concentration of 20% solids content, with the product obtained being 40% concentrated.

DETAILED DESCRIPTION OF THE INVENTION

Improving the methods for manufacturing self-binding particles constitutes an ongoing challenge for the person skilled in the art, as demonstrated by the previous documents which recount the advances in the field. Continuing her research in this direction, the Applicant has engineered a method for manufacturing self-binding particles comprising:

grinding at least one latex binder and at least one mineral material in an aqueous medium, in the presence of an aqueous solution of a fully or partially acidic, water-soluble copolymer as coupling agent, wherein:
  the aqueous solution of a fully or partially acidic, water-soluble copolymer is added to the aqueous medium before and/or during the grinding step,
and the aqueous solution of a fully or partially acidic, water-soluble copolymer comprises:
  a) of at least one ethylenically-unsaturated anionic monomer,
  b) at least one ethylenically-unsaturated oxyalkylated monomer terminated by a hydrophobic alkyl, alkylaryl, arylakyl, or aryl chain having 10 to 32 carbon atoms, and
  c) optionally, at least one other monomer.

The method optionally comprises at least one step of concentrating the suspension resulting from the grinding step, optionally with at least one dispersing agent. Further the method optionally comprises at least one step of drying the suspension resulting from either of the grinding or drying steps.

The aqueous solution of a fully or partially acidic, water-soluble copolymer comprises:
  a) at least one ethylenically-unsaturated anionic monomer,
  b) at least one ethylenically-unsaturated oxyalkylated monomer terminated by a hydrophobic alkyl, alkylaryl, arylakyl, or aryl chain having 10 to 32 carbon atoms, and
  c) optionally at least one other monomer, which is preferentially either an acrylic ester, and very preferentially ethyl acrylate, or an unsaturated amide, and very preferentially acrylamide.

Entirely surprisingly, as it contradicts the latest developments in the state of the art, acrylic acid ethylene copolymer salts like Polygen™ WE 4 are no longer implemented, even though such a compound would seem essential, as indicated in the documents mentioned above, in order to obtain self-binding particles. This ability to produce such self-binding or hybrid particles is reflected by the term "coupling agent" as used above.

With the inventive coupling agent, the present invention successfully achieves hybrid particles with as noteworthy a cohesive nature as in the prior art (Polygen™ WE 4), as illustrated by the measurements of the quantity of total organic carbon (TOC) present in the aqueous phase. Without wishing to be bound to any theory whatsoever, the Applicant believes that the lower the TOC values are, the better the cohesive forces within the hybrid particles are: only a low quantity of latex, surface active agents (which are used to stabilize the latex), and coupling agents are found in the aqueous phase. Furthermore, the water derived from the reconcentration method may thereby be reused, which constitutes another benefit arising from the present invention.

Furthermore, the inventive coupling agent is used in doses identical to that in which the Polygen of the prior art had been implemented. It is thereby demonstrated that aqueous suspensions of self-binding particles are achieved, whose dry solids content and rheological behavior are similar to those achieved with Polygen. In summary, the present invention offers the person skilled in the art an alternative to the sole product disclosed by the prior art, which contributes to enriching the state of the art and gives the professional greater freedom.

In one variant of the invention which does not comprise step b) of concentration nor step c) of drying, it is shown that the coupling agent implemented during step a) of grinding makes it possible to directly achieve a very high solids content for the aqueous suspension of hybrid particles that is manufactured: the step of concentration is no longer essential.

Thus, a first object of the invention is a method for manufacturing self-binding particles comprising:
  grinding at least one latex binder and at least one mineral material in an aqueous medium, in the presence of an aqueous solution of a fully or partially acidic, water-soluble copolymer as coupling agent, wherein:
    the aqueous solution of a fully or partially acidic, water-soluble copolymer is added to the aqueous medium before and/or during the grinding step,
    and the aqueous solution of a fully or partially acidic, water-soluble copolymer comprises:
    a) of at least one ethylenically-unsaturated anionic monomer,
    b) at least one ethylenically-unsaturated oxyalkylated monomer terminated by a hydrophobic alkyl, alkylaryl, arylakyl, or aryl chain having 10 to 32 carbon atoms, and
    c) optionally, at least one other monomer.

The method optionally comprises at least one step of concentrating the suspension resulting from the grinding step, optionally with at least one dispersing agent. Further the method optionally comprises at least one step of drying the suspension resulting from either of the grinding or drying steps.

The aqueous solution of a fully or partially acidic, water-soluble copolymer comprises:
  a) of at least one ethylenically-unsaturated anionic monomer,
  b) at least one ethylenically-unsaturated oxyalkylated monomer terminated by a hydrophobic alkyl, alkylaryl, arylakyl, or aryl chain having 10 to 32 carbon atoms, and
  c) optionally at least one other monomer, which is preferentially either an acrylic ester, and very preferentially ethyl acrylate, or an unsaturated amide, and very preferentially acrylamide.

Concentration refers to a step intended to increase the dry solids content of the suspension, such as, for example, filtration or centrifugation or any other mechanical reconcentration means.

This invention is further characterized in that said water-soluble copolymer comprises, expressed as a percentage by weight of each of the monomers (the total of these percentages being equal to 100%):
  a) 5% to 95%, preferentially 50% to 95%, and very preferentially 70% to 95%, of at least one ethylenically-unsaturated anionic monomer,
  b) 5% to 95%, preferentially 5% to 50%, very preferentially 5% to 30% and at least one ethylenically-unsaturated oxyalkylated monomer terminated by a hydrophobic alkyl, alkylaryl, arylakyl, or aryl chain having 10 to 32 carbon atoms,
  c) 0 to 30%, preferentially 0 to 20%, of at least one other monomer which is preferentially either an acrylic ester, and very preferentially ethyl acrylate, or an unsaturated amide, and very preferentially acrylamide.

The present invention is further characterized in that monomer a) is chosen from among acrylic acid, methacrylic acid, and mixtures thereof.

The present invention is further characterized in that monomer b) is a monomer whose formula (I) is:

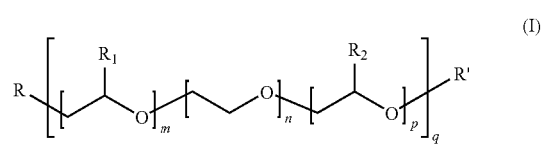

where:
  m, n, p are whole numbers less than 150 and at least one of them is greater than 0, q is a whole number greater than 0, which preferentially satisfy the requirement that $15 \leq (m+n+p)q \leq 150$, and very preferentially that $20 \leq (m+n+p)q \leq 60$,
  R is a radical that includes a polymerizable unsaturated function;
  $R_1$ and $R_2$ are identical or different, and represent hydrogen atoms or alkyl groups,
  R' represents a hydrophobic alkyl, alkylaryl, arylakyl, or aryl chain having 10 to 32 carbon atoms, In a first preferred embodiment, the present invention is further characterized in that R' represents a branched alkyl chain with 10 to 24 carbon atoms, and is the result of a linear alcohol condensation according to a Guerbet reaction, and is preferentially selected from 2-hexyl 1-decanyl, 2-octyl 1-dodecanyl, and mixtures thereof.

In a second preferred embodiment, the present invention is further characterized in that R' represents a phenol polystyryl, and preferentially is selected from a phenol distyryl, a phenol tristyryl, and mixtures thereof.

The present invention is further characterized in that R is chosen from among vinylic functions; acrylic, methacrylic, maleic, and urethane unsaturated esters, and preferentially from among acrylurethane, methacrylurethane, α-α' dimethyl-isopropenyl-benzylurethane, allylurethane, allylic or vinylic ethers whether substituted or not, ethylenically-unsaturated amides and imides, and is preferentially the methacrylic ester function.

The present invention is further characterized in that the water-soluble copolymer exhibits a molar neutralization rate of its acidic functions between 0% and 50%, preferentially 0% and 35%, and very preferentially 0% and 20%.

The present invention is further characterized in that the water-soluble copolymer, when it is partially acidic, is partially neutralized by one or more neutralization agents having a monovalent function or a polyvalent function, chosen preferentially from among sodium, potassium, and lithium hydroxides and mixtures thereof.

The invention is further characterized in that the mineral material implemented is chosen from among natural or synthetic calcium carbonate and mixtures thereof, and in that it is preferentially a natural calcium carbonate.

The invention is further characterized in that the latex binder is chosen from among natural binders, and preferentially from among starch, casein, proteins, cellulose, CMC (carboxymethyl cellulose), or EHEC (hydroxyethyl cellulose), or from among synthetic binders and preferentially acrylics, styrenes, styrene-acrylics, or mixtures thereof.

EXAMPLES

In each of the following tests, grinding is performed using a fixed-cylinder Dyno-Mill™ grinder with a rotating impeller, the grinding body of which consists of zirconium-based balls with a diameter between 0.6 mm and 1 mm. The total volume occupied by the grinding body is 1000 cubic centimeters, while its mass is 2700 g. The grinding chamber has a volume of 1400 cubic centimeters. The circumferential speed of the grinder is 10 meters per second. The pigment suspension is recycled at a rate of 40 liters per hour. The Dyno-Mill™'s outlet is equipped with a 200-micron mesh separator used to separate the suspension resulting from the grinding and the grinding body. The temperature during each grinding test is kept at about 30° C.

The TOC is measured in each aqueous suspension of hybrid particles, after grinding, and after filtering: the filtration water is retrieved, and this is used to measure the TOC. This measurement is performed using an analyzer sold by the company SHIMADZU™ under the name Total Organic Carbon Analyzer TOC-VCSH, completed by the ASI-V sample injector and the software TOC-Control V (SHIMADZU™).

A master solution containing 1000 ppm of Total Carbon is prepared in a 1 L vial, into which 2.125 grams of potassium hydrogenophthalate (previously dried in an oven at 110° C. and cooled in a desiccator) are weighed out, and which is filled up to the reference line.

A master solution containing 1000 ppm of Inorganic Carbon is prepared in a 1 L vial, into which 4.41 grams if sodium carbonate (previously dried in an oven to 280° C. and cooled in a desiccator) and 3.5 grams of sodium hydrogenocarbonate are weighed out, and which is filled up to the reference line.

The calibration lines from 0 to 100 ppm for Total Carbon are taken using the procedure TC-100-23082006.cal, and from 0 to 50 ppm for Inorganic Carbon using the procedure IC50-23082006.cal.

The Total Inorganic Carbon rate is obtained using the procedure TOC-280820006.met.

In all of the following tests, the concentrations of polymers are given as a percentage of the polymer by dry weight in relation to the dry weight of the mineral materials Unless otherwise indicated, all of the inventive polymers are partially neutralized, such that 10% of their carboxylic sites by molar weight are neutralized by the sodium ion. In all the tests implementing a partially neutralized polymer, sodium hydroxide is added during the dispersion step, so as to set the pH to a value between 8.5 and 10.

Example 1

This example relates to the manufacturing of an aqueous suspension of hybrid particles of calcium carbonate and binder, by way of a step of grinding involving a coupling agent and a step of concentration involving a dispersing agent.

In each of the tests, we start with an aqueous suspension of a natural calcium carbonate which is a Norway marble, whose dry solids content is equal to 17% of its total weight. Next, the coupling agent to be tested is added, as is 9.5% by dry weight of a styrene-acrylic binder sold by the company BASF™ under the name Acronal™ S 728.

After each grinding, the particle grain size characteristics of the resulting suspension, and particularly percentages by weight of particles with an average diameter less than 1 μm and 2 μm, respectively abbreviated % <1 μm and % <2 μm (using a Sedigraph™ 5100 device sold by the company. MICROMERITICS™).

Each suspension is then filtered through a Büchner™ filter-press: the result is a filter cake. This cake is then dispersed so as to obtain a dry solids content equal to 50% of its total weight. This step takes place in the presence of a dispersing agent.

The quantity of organic carbon in the aqueous phase is measured in the water resulting from filtration, using the method indicated in the introduction.

Next, the Brookfield™ viscosities are determined at 25° C., at 10 and 100 revolutions/minute at moments t=0 ($\mu_{10\ t=0}$, $\mu_{100\ t=0}$), t=8 days before agitation ($\mu_{10\ t=8\ PRE-AG}$, $\mu_{100\ t=8\ PRE-AG}$), t=8 days after agitation ($\mu_{10\ t=8\ POST-AG}$, $\mu_{100\ t=8\ POST-AG}$).

Test No. 1

This test illustrates the prior art and implements:
as a coupling agent, 0.5% by dry weight of Polygen™ WE 4 known as coupling agent #1, abbreviated AG1,
and as a dispersing agent:
 0.6% by dry weight of a copolymer made up of (by dry weight) 13% acrylic acid, 15% butyl acrylate, 31% methacrylic acid and 40% styrene, abbreviated AD1,
 0.1% by dry weight of a copolymer made up of (by weight) 45% maleic anhydride and 55% acrylic acid, abbreviated AD2, Test No. 2

This test illustrates the prior art and implements:
as a coupling agent abbreviated AG2, 0.5% by dry weight of Polygen™ WE 4, abbreviated AG1, and 0.2% by dry weight of a homopolymer of acrylic acid whose molecular weight is equal to 5,500 g/mol and neutralized 70% (by molar weight) by the sodium ion and 30% by the magnesium ion,
and as a dispersing agent, 0.6% by dry weight of compound AD1, and 0.1% by dry weight of compound AD2.

The TOC value is equal to 1217 ppm, which is very high: This means the manufactured hybrid particles do not have a particularly noteworthy self-binding nature, which is unsatisfactory for the person skilled in the art; as a result, no attempt was made to disperse or re-concentrate the medium.

Test No. 3

This test is not part of the invention, and implements:
As a coupling agent, 0.5% by dry weight of a homopolymer of acrylic acid whose molecular weight is equal to 11,000 g/mol, known as coupling agent #3 and abbreviated AG3, The TOC value here is extremely high (greater than 12,000 ppm): it is likely that self-binding particles have not been successfully manufactured. Therefore, no attempt has been made to disperse or re-concentrate the medium.

Test No. 4

This test is not part of the invention, and implements:
as a coupling agent, 0.5% by dry weight of copolymer AD1 (which will also be abbreviated AG4).

The TOC value is equal to 688 ppm, which is very high: This means the manufactured hybrid particles do not have a particularly noteworthy self-binding nature, which is unsatisfactory for the person skilled in the art; as a result, no attempt was made to disperse or re-concentrate the medium.

Test No. 5

This test is not part of the invention, and implements:

as a coupling agent, 0.5% by dry weight of a copolymer made up of (by weight) 14% acrylic acid, 5% methacrylic acid, and 81% methoxy-polyethylene glycol methacrylate whose molecular weight is equal to 2,000 g/mol, also known as coupling agent #5 and abbreviated AG5, and as a dispersing agent, 0.6% by dry weight of copolymer AD1, and 0.1% by dry weight of copolymer AD2.

As in the previous test, the TOC value remains high (451 ppm): This means the manufactured hybrid particles do not have a particularly noteworthy self-binding nature; that said, it is greater than in tests #2, #3, and #4: an attempt was therefore made to re-disperse the medium.

Test No. 6

This test is not part of the invention, and implements:

as a coupling agent, 0.5% by dry weight of a water-soluble copolymer made up of (by weight) 85% acrylic acid, and 15.0% by weight of a monomer with the formula (I) in which R represents the methacrylic ester function, m=p=0, q=1, n=25, R' represents the linear alkyl chain having 8 carbon atoms, known as coupling agent #6 and abbreviated AG6, and as a dispersing agent, 0.6% by dry weight of copolymer AD1, and 0.1% by dry weight of copolymer AD2, The TOC value is equal to 300 which remains high, but less so than in the previous tests; in this particular case, an attempt was therefore made to re-concentrate the medium. However, the viscosity values achieved prove to be very high when compared to the results obtained with the inventive products (table 1).

Test No. 7

This test illustrates the invention, and implements:

as a coupling agent, 0.5% by dry weight of a water-soluble copolymer made up of (by weight) 60.0% acrylic acid, 1.0% methacrylic acid, 15% ethyl acrylate and 24.0% by weight of a monomer with the formula (I) in which R represents the methacrylic ester function, R' represents 2-hexyl 1-decanyl, m=p=0, q=1, n=25, known as coupling agent #7 and abbreviated AG7, and as a dispersing agent, 0.6% by dry weight of copolymer AD1, and 0.1% by dry weight of copolymer AD2.

Test No. 8

This test illustrates the invention, and implements:

as a coupling agent, 0.5% by dry weight of a water-soluble copolymer made up of (by weight) 85.0% acrylic acid, and 15.0% by weight of a monomer with the formula (I) in which R represents the methacrylic ester function, R' represents 2-hexyl 1-dodecanyl, m=p=0, q=1, n=25, known as coupling agent #8 and abbreviated AG8, and as a dispersing agent, 0.6% by dry weight of copolymer AD1, and 0.1% by dry weight of copolymer AD2.

Test No. 9

This test illustrates the invention, and implements:

as a coupling agent, 0.5% by dry weight of a water-soluble copolymer made up of (by weight) 85.0% acrylic acid, and 15.0% by weight of a monomer with the formula (I) in which R represents the methacrylic ester function, R' represents the linear alkyl chain having 22 carbon atoms, m=p=0, q=1, n=25, known as coupling agent #9 and abbreviated AG9, and as a dispersing agent, 0.6% by dry weight of copolymer AD1, and 0.1% by dry weight of copolymer AD2.

Test No. 10

This test illustrates the invention, and implements:

as a coupling agent, 0.5% by dry weight of a water-soluble copolymer made up of (by weight) 85.0% acrylic acid, and 15.0% by weight of a monomer with the formula (I) in which R represents the methacrylic ester function, R' represents the branched alkyl chain having 32 carbon atoms, m=p=0, q=1, n=25, known as coupling agent #10 and abbreviated AG10, and as a dispersing agent, 0.6% by dry weight of copolymer AD1, and 0.1% by dry weight of copolymer AD2, Test No. 11

This test illustrates the invention, and implements:

as a coupling agent, 0.5% by dry weight of a water-soluble copolymer made up of (by weight) 85.0% acrylic acid, and 15.0% by weight of a monomer with the formula (I) in which R represents the nonylphenol group, m=p=0, q=1, n=25, known as coupling agent #11 and abbreviated AG11, and as a dispersing agent, 0.6% by dry weight of copolymer AD1, and 0.1% by dry weight of copolymer AD2.

Test No. 12

This test illustrates the invention, and implements:

as a coupling agent, 0.5% by dry weight of a water-soluble copolymer made up of (by weight) 85.0% acrylic acid, and 15.0% by weight of a monomer with the formula (I) in which R represents the linear alkyl chain having 12 carbon atoms, m=p=0, q=1, n=23, known as coupling agent #12 and abbreviated AG12, and as a dispersing agent, 0.6% by dry weight of copolymer AD1, and 0.1% by dry weight of copolymer AD2.

TABLE 1

| | Test No. | | | | | |
|---|---|---|---|---|---|---|
| | 1 | 2 | 3 | 4 | 5 | 6 |
| Invention | PA | PA | OI | OI | OI | OI |
| Prior Art | | | | | | |
| Outside Invention | | | | | | |
| Coupling agent  nature | AG1 | AG2 | AG3 | AG4 (=AD1) | AG5 | AG6 |
| dose (%) | 0.5 | 0.5-0.2 | 0.5 | 0.5 | 0.5 | 0.5 |
| % < 2 μm | 96 | 97.7 | 96.1 | 96 | 95.3 | |
| % < 1 μm | 76.3 | 73 | 74.6 | 73.5 | 73.9 | |
| TOC (ppm) | 142 | 1217 | 12672 | 688 | 451 | 305 |
| Dispersing agent  nature | AD1-AD2 | — | — | — | — | AD1-AD2 |
| dose (%) | 0.6-0.1 | — | — | — | — | 0.6-0.1 |
| SC (%) | 48.9 | — | — | — | — | 48.8 |
| μ10 t = 0 | 630 | — | — | — | — | 3500 |
| μ100 t = 0 | 190 | — | — | — | — | 720 |

TABLE 1-continued

| | | | | | | |
|---|---|---|---|---|---|---|
| µ10 t = 8 PRE-AG | 1960 | — | — | — | — | 7350 |
| µ100 t = 8 PRE-AG | 530 | — | — | — | — | 2520 |
| µ10 t = 8 POST-AG | 840 | — | — | — | — | 8950 |
| µ100 t = 8 POST-AG | 220 | — | — | — | — | 1200 |

| | | Test No. | | | | | |
|---|---|---|---|---|---|---|---|
| | | 7 | 8 | 9 | 10 | 11 | 12 |
| Invention | | IN | IN | IN | IN | IN | IN |
| Prior Art | | | | | | | |
| Outside Invention | | | | | | | |
| Coupling | nature | AG7 | AG8 | AG9 | AG10 | AG11 | AG12 |
| agent | dose (%) | 0.5 | 0.5 | 0.5 | 0.5 | 0.5 | 0.5 |
| % < 2 µm | | 97.1 | 96.2 | 97.4 | 97.1 | 96.8 | 97.3 |
| % < 1 µm | | 76.3 | 76.5 | 75.8 | 74.6 | 73.8 | 73.6 |
| TOC (ppm) | | 140 | 98 | 70 | 116 | 124 | 111 |
| Dispersing | nature | AD1-AD2 | AD1-AD2 | AD1-AD2 | AD1-AD2 | AD1-AD2 | AD1-AD2 |
| agent | dose (%) | 0.6-0.1 | 0.6-0.1 | 0.6-0.1 | 0.6-0.1 | 0.6-0.1 | 0.6-0.1 |
| SC (%) | | 47.3 | 50.5 | 50.5 | 50.3 | 52.6 | 48.6 |
| µ10 t = 0 | | 410 | 950 | 700 | 820 | 1200 | 600 |
| µ100 t = 0 | | 410 | 235 | 170 | 200 | 280 | 150 |
| µ10 t = 8 PRE-AG | | 4220 | 1240 | 530 | 970 | 1180 | 1290 |
| µ100 t = 8 PRE-AG | | 650 | 290 | 210 | 220 | 400 | 300 |
| µ10 t = 8 POST-AG | | 3450 | 500 | 410 | 400 | 1310 | 640 |
| µ100 t = 8 POST-AG | | 450 | 122 | 100 | 100 | 260 | 140 |

These results demonstrate that the inventive copolymers, when implemented as a coupling agent in tests 7 to 12, lead, as in test 1, both to fairly low TOC values (less than 200 ppm), which means that the manufactured hybrid particles have a noteworthy self-binding nature, and to aqueous suspensions of self-binding particles that are stable and workable over time. These products therefore constitute an alternative to the sole solution proposed by the prior art.

Example 2

This example relates to the manufacturing of an aqueous suspension of hybrid particles of calcium carbonate and binder, by way of a step of grinding implementing a coupling agent and a step of concentration implementing a dispersing agent.

The method described in example 1 is followed precisely, with the minor exception that the concentration is performed so as to achieve a final solids content of 68%.

Test No. 13

This test illustrates the invention, and implements:
as a coupling agent, 0.5% by dry weight of copolymer AG7,
and as a dispersing agent, 0.6% by dry weight of copolymer AD1, and 0.1% by dry weight of copolymer AD2.

The results obtained (table 2) demonstrate that the inventive copolymer, when implemented as a coupling agent, leads both to a fairly low TOC value (less than 200 ppm) which means that the manufactured hybrid particles have a noteworthy self-binding nature, and to an aqueous suspension of self-binding particles that is stable and workable over time.

TABLE 2

| Test No. | | 13 |
|---|---|---|
| | | 13-a |
| Coupling | nature | AG13 (=AG7) |
| agent | dose (%) | 0.5 |
| % <2 µm | | |
| % <1 µm | | |
| TOC (ppm) | | 141 |
| Dispersing | nature | AD1-AD2 |
| agent | dose (%) | 0.5-0.1 |

TABLE 2-continued

| SC (%) | 68.8 |
|---|---|
| µ10 t = 0 | 10 |
| µ100 t = 0 | 39 |
| µ10 t = 8 PRE-AG | 10 |
| µ10 t = 8 PRE-AG | 32 |
| µ10 t = 8 POST-AG | 20 |
| µ10 t = 8 POST-AG | 50 |

Example 3

This example relates to the manufacture of an aqueous suspension of hybrid particles of calcium carbonate and a binder, through a single step of grinding involving a coupling agent, without any later phase of concentration.

The method described in example 1 is followed, with the minor exception that the concentration is performed so as to achieve a final solids content of 70%. Here, the suspension is filtered after grinding and the TOC of the filtration water is measured.

Test No. 14

This test illustrates the invention and implements, as a coupling agent, 0.5% by dry weight of copolymer AG7.

The results obtained (table 3) demonstrate that the inventive copolymer, when implemented as a coupling agent, leads both to a fairly low TOC value (less than 200 ppm) which means that the manufactured hybrid particles have a noteworthy self-binding nature, and to an aqueous suspension of self-binding particles that is stable and workable over time. Furthermore, the implementation of this coupling agent has made it possible to perform direct high-concentration grinding (70% hybrid particles by dry weight).

TABLE 3

| Test No. | | 14 |
|---|---|---|
| Coupling | nature | AG14 (=AG7) |
| agent | dose (%) | 0.5 |
| % <2 µm | | 97.7 |
| % <1 µm | | 70.0 |
| TOC (ppm) | | |

TABLE 3-continued

| | |
|---|---|
| SC (%) | 70 |
| μ10 t = 0 | 1250 |
| μ100 t = 0 | 350 |
| μ10 t = 8 PRE-AG | 1390 |
| μ10 t = 8 PRE-AG | 520 |
| μ10 t = 8 POST-AG | 1420 |
| μ10 t = 8 POST-AG | 610 |

The invention claimed is:

1. A method for manufacturing self-binding particles comprising:

grinding at least one latex binder and at least one mineral material in an aqueous medium, in the presence of an aqueous solution of a fully or partially acidic, water-soluble copolymer as coupling agent, wherein:

the aqueous solution of a fully or partially acidic, water-soluble copolymer is added to the aqueous medium before and/or during the grinding step, and the aqueous solution of a fully or partially acidic, water-soluble copolymer comprises:

a) of at least one ethylenically-unsaturated anionic monomer, b) at least one ethylenically-unsaturated oxyalkylated monomer terminated by a hydrophobic alkyl, alkylaryl, arylakyl, or aryl chain having 10 to 32 carbon atoms, and c) optionally, at least one other monomer.

2. The method of claim 1, further comprising concentrating a suspension resulting from the grinding step, optionally, with at least one dispersing agent.

3. The method of claim 1, further comprising drying a suspension resulting from the grinding step.

4. The method of claim 2, further comprising drying the suspension resulting from the concentrating step.

5. The method of claim 1, wherein the at least one other monomer c) comprises an acrylic ester or an unsaturated amide.

6. The method of claim 5, wherein the at least one other monomer c) is ethyl acrylate.

7. The method of claim 5, wherein the at least one other monomer c) is acrylamide.

8. The method of claim 1, wherein said water-soluble copolymer comprises, expressed as a percentage by weight of each of the monomers (the total of these percentages being equal to 100%):

5% to 95% of at least one ethylenically-unsaturated anionic monomer a),

5% to 95% of at least one ethylenically-unsaturated oxyalkylated monomer terminated by a hydrophobic alkyl, alkylaryl, arylakyl, or aryl chain having 10 to 32 carbon atoms b), and 0 to 30% of at least one other monomer c).

9. The method of claim 1, wherein the at least one ethylenically-unsaturated anionic monomer a) is at least one member selected from the group consisting of acrylic acid, methacrylic acid, and mixtures thereof.

10. The method of claim 1, wherein the at least one ethylenically-unsaturated oxyalkylated monomer b) is a monomer with the formula (I):

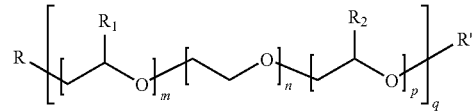

where:
m, n, p are whole numbers less than 150 and at least one of them is greater than 0, q is a whole number greater than 0, R is a radical having a polymerizable unsaturated function;

$R_1$ and $R_2$ are identical or different, and represent hydrogen atoms or alkyl groups, R' represents a hydrophobic alkyl, alkylaryl, arylakyl, or aryl chain having 10 to 32 carbon atoms.

11. The method of claim 10, wherein in the formula (I), the following relationship is satisfied:

$$15 \leq (m+n+p)q \leq 150.$$

12. The method of claim 11, wherein in the formula (I), the following relationship is satisfied:

$$20 \leq (m+n+p)q \leq 60.$$

13. The method of claim 10, wherein R' represents a branched alkyl chain with 10 to 24 carbon atoms, and is the result of a linear alcohol condensation according to a Guerbet reaction.

14. The method of claim 13, wherein R' represents a member selected from the group consisting of 2-hexyl 1-decanyl, 2-octyl 1-dodecanyl, and mixtures thereof.

15. The method of claim 10, wherein R' represents a phenol polystyryl.

16. The method of claim 15, wherein the phenol polystyryl is a member selected from the group consisting of a phenol distyryl, a phenol tristyryl, and mixtures thereof.

17. The method of claim 10, wherein R is a member selected from the group consisting of vinylic groups, acrylic esters, methacrylic esters, maleic esters, and urethane unsaturated esters.

18. The method of claim 17, wherein R is a member selected from the group consisting of acrylurethane, methacrylurethane, α-α' dimethyl-isopropenyl-benzylurethane, allylurethane, substituted and unsubstituted allylic ethers, substituted and unsubstituted vinylic ethers, ethylenically-unsaturated amides, and ethylenically-unsaturated imides.

19. The method of claim 18, wherein R is a methacrylic ester group.

20. The method of claim 1, wherein said water-soluble copolymer exhibits a molar neutralization rate of its acidic functions between 0% and 50%.

21. The method of claim 1, wherein said water-soluble copolymer, when partially acidic, is partially neutralized by one or more neutralization agents having a monovalent function or a polyvalent function.

22. The method of claim 21, wherein said one or more neutralization agents are at least one member selected from the group consisting of sodium hydroxide, potassium hydroxide, lithium hydroxide, and mixtures thereof.

23. The method of claim 1, wherein the mineral material is a member selected from the group consisting of natural calcium carbonate, synthetic calcium carbonate and mixtures thereof.

24. The method of claim 1, wherein the mineral material is natural calcium carbonate.

25. The method of claim 1, wherein the latex binder is a member selected from the group consisting of natural binders, synthetic binders, and mixtures thereof.

26. The method of claim 25, wherein the latex binder is a member selected from the group consisting of starch, casein, proteins, cellulose, CMC (carboxymethyl cellulose), EHEC (hydroxyethyl cellulose), acrylics, styrenes, styrene-acrylics, and mixtures thereof.

* * * * *